United States Patent [19]
Yoo et al.

[11] Patent Number: 5,777,973
[45] Date of Patent: Jul. 7, 1998

[54] REPRODUCING AND RECORDING OPTICAL PICKUP COMPATIBLE WITH DISCS HAVING DIFFERENT THICKNESSES

[75] Inventors: Jang-hoon Yoo, Seoul; Chong-sam Chung, Seongnam; Chul-woo Lee, Seoul; Kyung-hwa Rim; Kun-ho Cho, both of Suwon, all of Rep. of Korea

[73] Assignee: Samsung Electronics Co., Ltd., Suwon, Rep. of Korea

[21] Appl. No.: 761,826

[22] Filed: Dec. 6, 1996

[30] Foreign Application Priority Data

Dec. 7, 1995 [KR] Rep. of Korea ................ 1995-47452

[51] Int. Cl.$^6$ ........................................ G11B 7/00
[52] U.S. Cl. ...................... 369/109; 369/112; 369/118
[58] Field of Search ............................. 369/109, 103, 369/112, 117, 118; 359/19

[56] References Cited

U.S. PATENT DOCUMENTS

| | | | |
|---|---|---|---|
| 5,281,797 | 1/1994 | Tatsuno et al. | 369/118 |
| 5,446,565 | 8/1995 | Komma et al. | 369/103 |

FOREIGN PATENT DOCUMENTS

| | | |
|---|---|---|
| 0 610 055 | 8/1984 | European Pat. Off. . |
| 7-98431 | 4/1995 | Japan . |
| 7-302437 | 11/1995 | Japan . |

Primary Examiner—Tan Dinh
Attorney, Agent, or Firm—Staas & Halsey

[57] ABSTRACT

A reproducing/recording optical pickup compatible with discs having different thicknesses includes a transparent plate having a central portion formed with a diffraction grating pattern for diffracting the light travelling from the light source to the objective lens, and a transparent portion through which the light passes, and a photodetector having first and second light receiving portions. The zero-order transmitted light and the passing light are focused using all regions of the aperture of the objective lens with respect to a thin disc. The positive first-order diffracted light diffracted by the diffraction grating pattern of the transparent plate is focused onto a thick disc by partial regions of the objective lens. Then, the reflected lights thereof are detected by the first and second light receiving portions, respectively. Because signals for reproduction and servo for each disc are detected as the detection signals of the first and second light receiving portions, stable servo and noiseless reproduction are possible, irrespective of the thickness of the disc used.

23 Claims, 4 Drawing Sheets

REPRODUCING AND RECORDING OPTICAL PICKUP COMPATIBLE WITH DISCS HAVING DIFFERENT THICKNESSES

BACKGROUND OF THE INVENTION

1. Field of the Invention

The present invention relates to an optical pickup for reading and writing information by scanning an optical recording medium with an optical beam, and more particularly, to a reproducing and recording optical pickup compatible with discs having different thicknesses.

2. Description of the Related Art

An optical recording medium for storing data is mainly of the disc-type, for example, a compact disc. A disc is comprised of a plastic or glass substrate which is transparent to incident light and having a predetermined thickness, and a recording plane coated on the substrate, on which information is recorded. When light is emitted from an optical pickup, the light is focused by an objective lens of the optical pickup to pass through the substrate of the disc, thereby being refracted. The refracted light reaches the recording plane and is then reflected from the recording plane to the optical pickup.

In order to increase the recording density of the disc, it is necessary to reduce the size of the light spot landing on the recording plane as much as possible. The diameter of the spot is generally proportional to a numerical aperture (NA) of the objective lens and is inversely proportional to a wavelength of the light. Thus, in order to obtain a very small spot for high-density reproduction and recording, currently, it is common to use an objective lens having a large NA and a light source having a short wavelength. However, the objective lens having a large NA drastically increases the spot aberration on the recording plane when the disc is not directly perpendicular to the beam. Thus, for high-density discs, the tilt allowance of the disc should be controlled more precisely. Since the aberration is also proportional to the substrate thickness of the disc, the substrate is made thin so as to increase the tilt allowance of the high-density disc. Accordingly, as a high-density disc, a digital video disc having a substrate thickness of 0.6 mm has come about, in lieu of the conventional compact disc having a substrate thickness of 1.2 mm.

In optical reproduction and recording, compatibility between the compact disc and the digital video disc is an important factor from the standpoint of the user. However, if the disc thicknesses are different, spherical aberration is generated, which enlarges the spot formed on the recording plane of the disc. This in turn results in an insufficient light intensity necessary for recording and a deterioration of signals during reproduction. Thus, it is necessary for an optical pickup to read and write information with an aberration-corrected spot, that is, which is compatible with discs having different thicknesses.

As one such conventional compatible optical pickup, there is a well-known technology disclosed in the Japanese laid-open publication hei 7-98431, in which a hologram lens is installed in the receiving side of an objective lens, and aberration-corrected spots are formed respectively on the recording planes of discs having different thicknesses, utilizing the difference between emitting angles of zero-order transmitted light and first-order diffracted light by the hologram lens. However, according to this technology, the diffraction efficiency of the hologram lens is 40% at most. Further, since the light emitted from the optical pickup passes through the hologram lens twice along the optical path, the amount of light finally received in the photodetector is noticeably reduced.

Also, U.S. Pat. No. 5,281,797 by Tatsuno et al. teaches a technology of adjusting the numerical aperture (NA) of an objective lens by a plate having two apertures of different diameters, a diaphragm for use in a camera, or a liquid crystal device (LCD). In the case of employing the plate or diaphragm, complex devices are necessary for driving the same mechanically. In the case of employing the LCD, the device is simply driven by electrical signals. However, in view of endurance and heat-resistance, the LCD cannot attain reliability for an extended period of time.

Also, two objective lenses optimized depending on the disc thickness may be alternatively used, but such a technique is not desirous as the objective lenses are required to be mechanically driven.

SUMMARY OF THE INVENTION

It is an object of the present invention to provide a reproducing and recording optical pickup compatible with discs having different thicknesses, having means for adjusting the numerical aperture (NA) of an objective lens without being mechanically and electrically driven in order to form light spots having aberrations which are corrected with respect to the discs having different thicknesses, and which can obtain a light efficiency higher than that of the conventional optical pickup adopting the hologram lens.

To accomplish the above and other objects, there is provided an optical pickup having a light source, an objective lens for focusing the light generated from the light source onto a disc and a photodetector for detecting a signal by receiving the light reflected from the disc. The optical pickup is for recording or reproducing information and comprises a transparent plate having a central portion formed with a diffraction grating pattern for diffracting a first portion of light travelling from the light source through the diffraction grating pattern to the objective lens, and a transparent portion through which a second portion of light from the light source passes, wherein a zero-order transmitted light separated by the diffraction grating pattern (the diffracted light) and the light passing through the transparent portion are focused onto the disc by the objective lens if the disc is a thin disc, and a positive first-order diffracted light separated by the diffraction grating pattern is focused onto the disc by the objective lens if the disc is a thick disc.

According to the present invention, a beam splitter may be provided in the optical path between the light source and the objective lens, for splitting the light path of incident light travelling from the light source toward the objective lens in the optical path, wherein the transparent plate having the diffraction grating pattern is disposed in the optical path between the light source and the beam splitter.

Further, the present invention may be constructed such that a separate diffraction grating is provided between the objective lens and the transparent plate, for diffracting the light transmitted via the transparent plate into a zero-order light and positive and negative first-order diffracted lights, wherein the photodetector includes first and second light receiving portions for receiving the reflected lights of the zero-order transmitted light being reflected from the discs having different thicknesses, respectively, and third and fourth light receiving portions for receiving the positive and negative first-order diffracted lights.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE INVENTION

Figure 1:
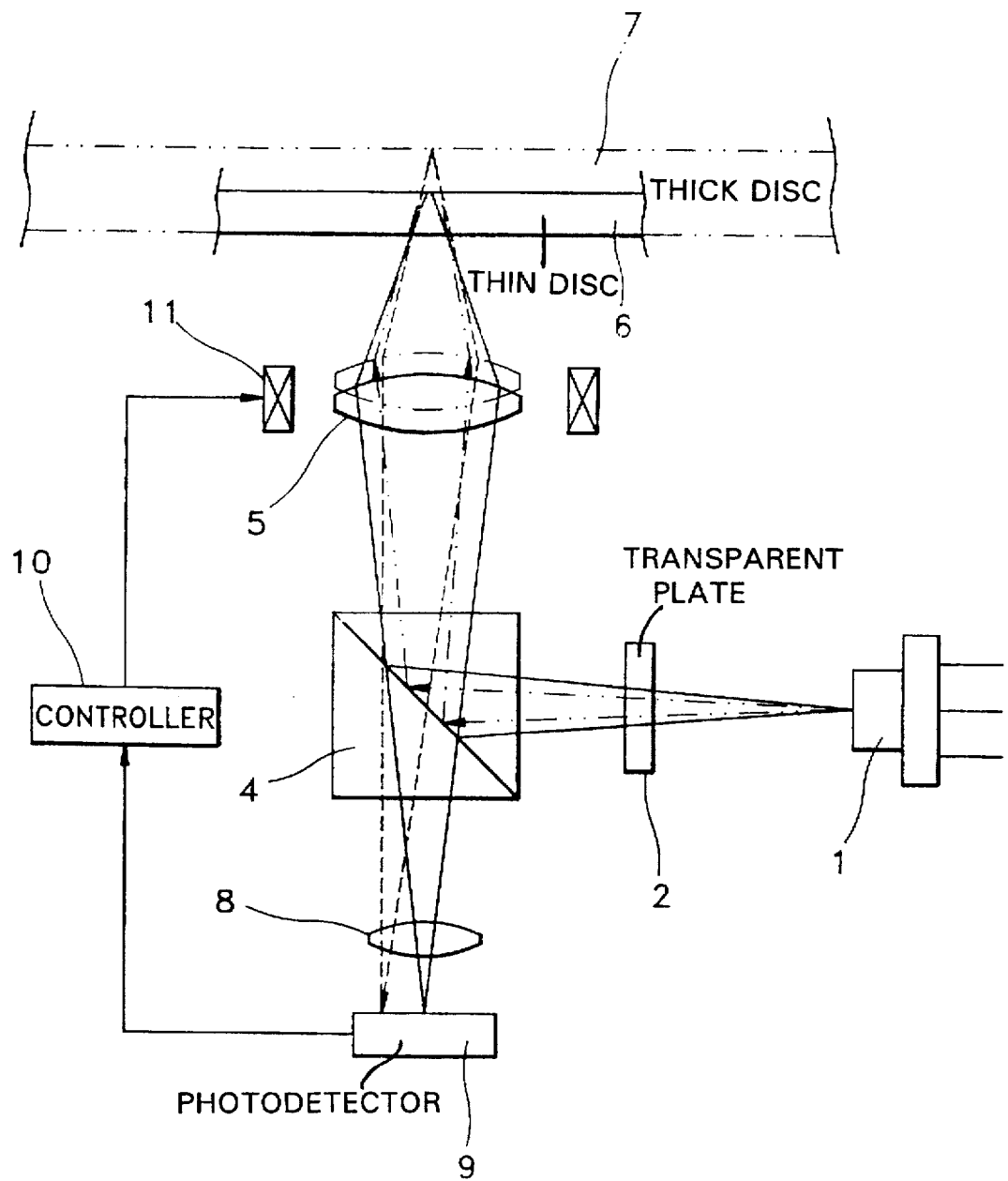
FIG. 1 is a schematic diagram illustrating an optical structure of a reproducing and recording optical pickup compatible with discs having different thicknesses according to an embodiment of the present invention.

In FIG. 1, reference numeral 1 denotes a light source, reference numeral 2 denotes a transparent plate having a diffraction grating pattern 3 (see FIG. 2), reference numeral 4 denotes a beam splitter, reference numeral 5 denotes an objective lens, reference numerals 6 and 7 denote thin and thick discs, respectively, reference numeral 8 denotes an astigmatism lens, reference numeral 9 denotes a photodetector, reference numeral 10 denotes a controller, and reference numeral 11 denotes an actuator for the objective lens 5. Here, the two discs 6 and 7 have different thicknesses, either of which may be placed in an optical reproducing/recording device. For example, the high-density thin disc 6 is a 0.6 mm thick digital video disc, and the thick disc 7 is a 1.2 mm thick compact disc. A laser diode for emitting a laser beam is employed as the light source 1. The light emitted from the light source 1 passes through the transparent plate 2, reflected by the beam splitter 4 and focused onto either of the discs 6 and 7 by the objective lens 5. The light reflected from the one of the discs 6 and 7 placed in the optical reproducing/recording device passes back through the objective lens 5 and through the beam splitter 4, and is received in the photodetector 9 via the astigmatism lens 8. The photodetector 9 detects signals for reproducing the information recorded on the disc 6 (7) and signals indicative of focus and track positions of the objective lens 5 with respect to the respective disc 6 (7), to then transmit the same to the controller 10. The controller 10 operates the actuator 11 to adjust the focus and compensate for tracking errors of the objective lens 5 in accordance with the transmitted signals.

Figure 2:
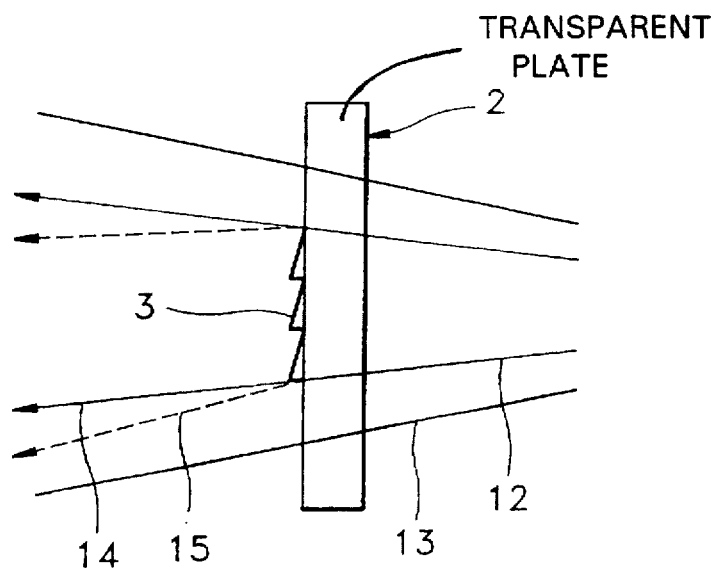
FIG. 2 is a profile showing a light path for a transparent plate shown in FIG. 1 having a diffraction grating pattern.

In the aforementioned configuration, the transparent plate 2 has a diffraction grating pattern 3 engraved in the center thereof, as shown in FIG. 2. The light 12 emitted from the light source 1 and passing through a central portion, i.e., the region where the diffraction grating pattern 3 is formed, is diffracted by the diffraction grating pattern 3 and the light passing through a transparent portion, i.e., the region around the diffraction grating pattern 3, is transmitted through the regions other than the diffraction grating pattern 3. The diffraction grating pattern 3 of the transparent plate 2 diffracts the incident light 12 into a zero-order transmitted light 14 and a positive first-order diffracted light 15. Here, the diffraction grating pattern 3 is manufactured as a serration-type, as shown in FIG. 2 to increase light efficiency. The zero-order transmitted light 14 and the positive first-order diffracted light 15 can be separated by the serration-type diffraction grating pattern 3 such that the amount of the zero-order transmitted light 14 and the positive first-order diffracted light 15 are 40% of the original light intensity, respectively.

At this time, the useless negative first-order diffracted light (not shown) can be reduced to less than 5%.

The zero-order transmitted light 14 travels along its original direction to then be focused onto the thin disc 6 by the objective lens 5, together with the light 13 passing through the far-axis portion. In other words, since the light is focused using all regions of the aperture of the objective lens 5 with respect to the thin disc 6, a very tiny spot can be formed on the thin disc 6. The positive first-order diffracted light 15 is also focused onto the thick disc 7 by the objective lens 5. At this time, by using limited regions of the aperture of the objective lens 5, an aberration-corrected spot is formed on the thick disc 7. Here, the emitting angles of the zero-order transmitted light 14 and the light 13 of the far-axis portion do not change. Therefore, the very small spot formed on the thin disc 6 is formed along the optical axis of the objective lens 5. However, since the emitting angle of the positive first-order diffracted light 15 is slightly changed, the spot on the thick disc 7 is spaced slightly apart from the optical axis of the objective lens 5 (see FIG. 1).

Figure 3:
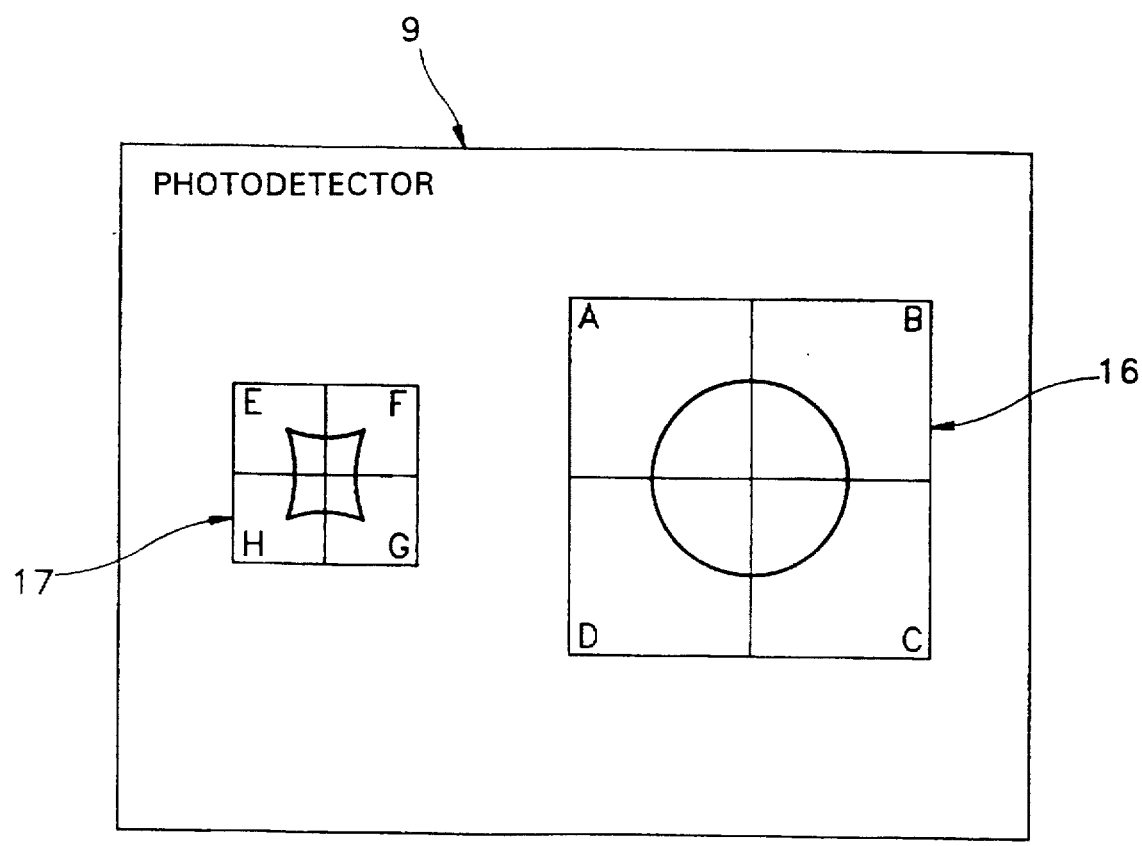
FIG. 3 is a detailed plan view of a photodetector shown in FIG. 1.

FIG. 3 is a plan view of the photodetector 9 shown in FIG. 1. The photodetector 9 includes a first light receiving portion 16 and a second light receiving portion 17. The first and second light receiving portions 16 and 17 are divided into four regions A–D and E–H, respectively. The first light receiving portion 16 is formed at a position coinciding with the central axis of the objective lens 5 so as to receive light reflected from the thin disc 6, and the second light receiving portion 17 is formed next to the first light receiving portion 16 so as to receive light reflected from the thick disc 7. Therefore, when using the thin or thick discs 6 or 7, the respective reproduction signals and signals indicative of each focus and track position are calculated from the first light receiving portion 16 and the second light receiving portion 17 of the photodetector 9, respectively as follows.

When using the thin disc 6:

$S1 = S_a + S_b + S_c + S_d$ ... Reproduction signal, $S2 = (S_a + S_c) - (S_b + S_d)$ ... Focus error signal, and $S3 = (S_a + S_b) - (S_c + S_d)$ ... Tracking error signal.

When using the thick disc 7:

$S4 = S_e + S_f + S_g + S_h$ ... Reproduction signal, $S5 = (S_e + S_g) - (S_f + S_h)$ ... Focus error signal, and $S6 = (S_e + S_f) - (S_g + S_h)$ ... Tracking error signal.

Here, $S_a$ through $S_h$ are signals output from the divided regions A through H, respectively.

The focus and tracking error signals are transmitted to the controller 10 (FIG. 1), which in turn operates the actuator 11 so that the vertical and horizontal positions of the objective lens 5 are controlled according to the focus and tracking error signals.

Figure 4:
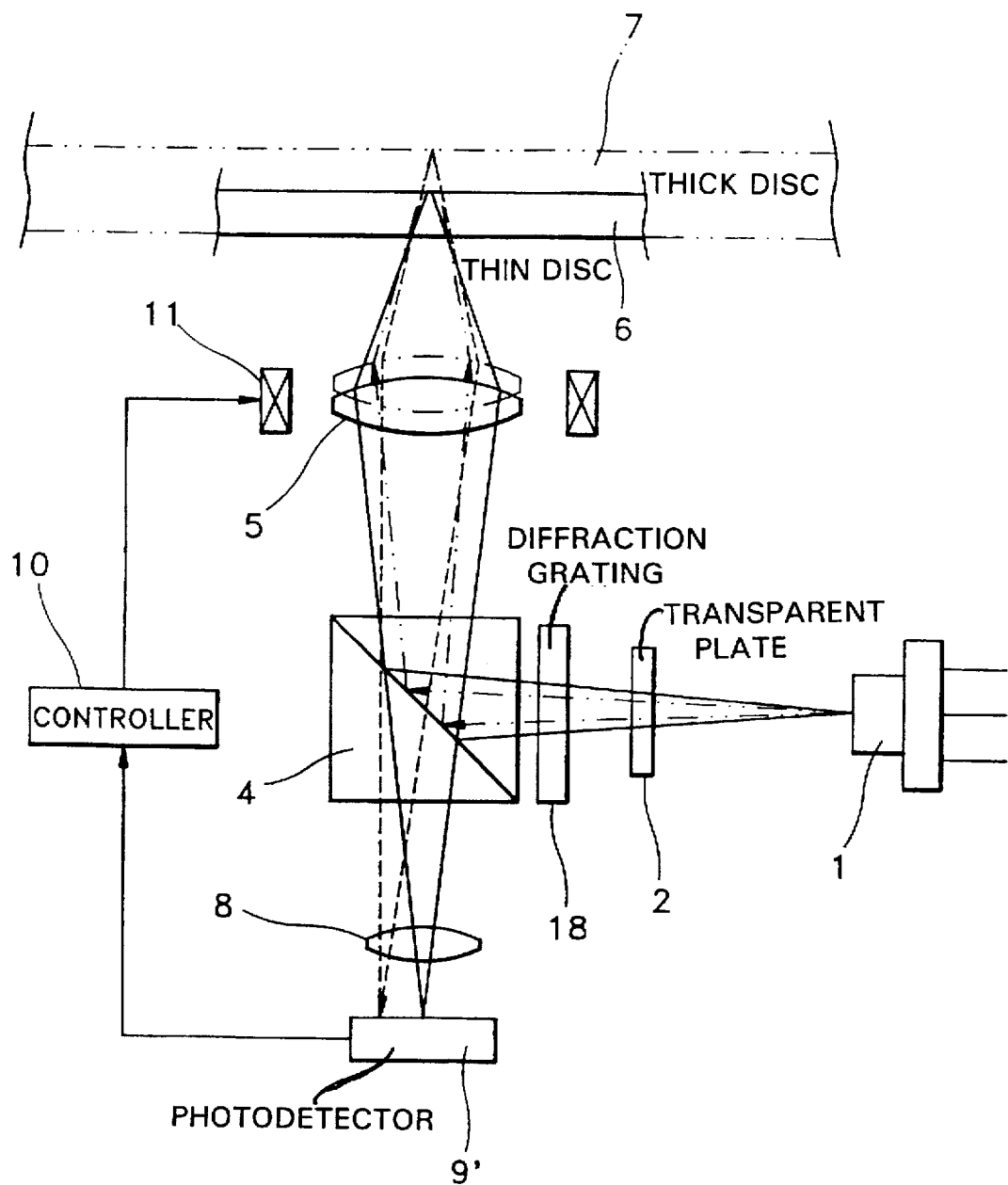
FIG. 4 is a schematic diagram illustrating the optical structure of a reproducing and recording optical pickup compatible with discs having different thicknesses according to a second embodiment of the present invention.
Figure 5:
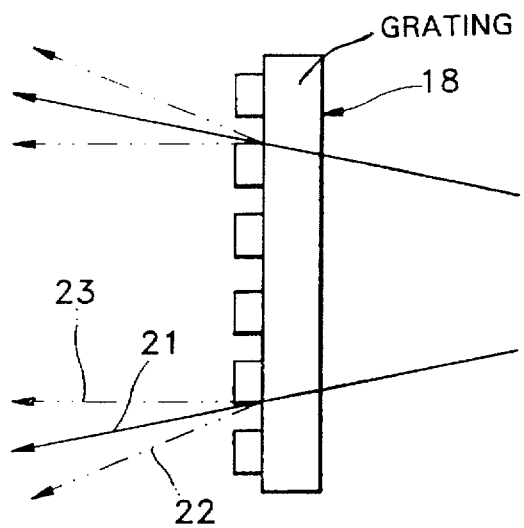
FIG. 5 is a profile showing a light path for a diffraction grating shown in FIG. 4.
Figure 6:
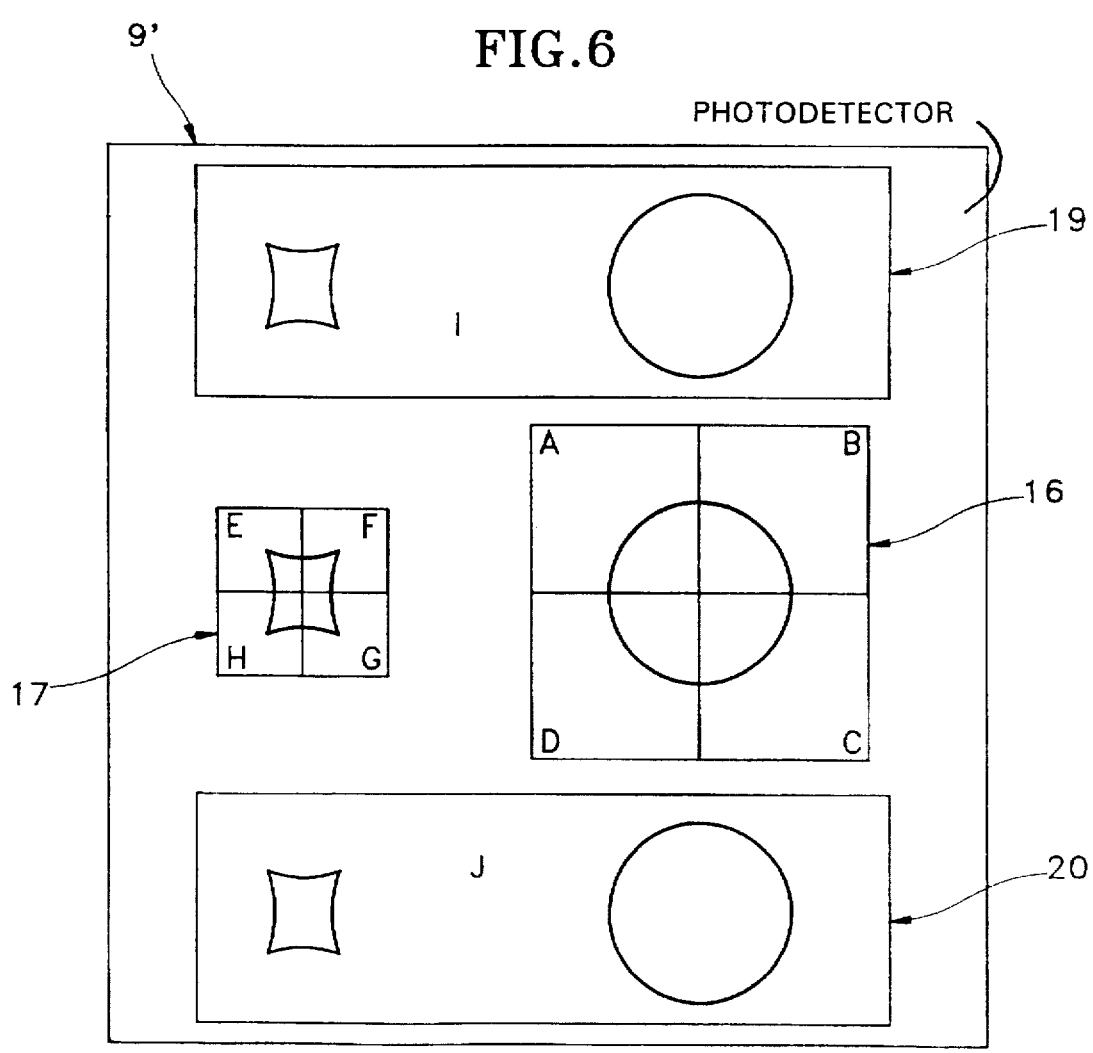
FIG. 6 is a detailed plan view of a photodetector shown in FIG. 4.

FIG. 4, in which like reference numerals shown in FIG. 1 indicate like elements, illustrates the reproducing and recording optical pickup compatible with discs having different thicknesses according to a second embodiment of the present invention, which is constructed to detect a track servo signal using three beams. In this embodiment, there is further provided a diffraction grating 18 between the transparent plate 2 and the beam splitter 4, and a photodetector 9' further includes third and fourth light receiving portions 19 and 20, as shown in FIG. 6. Referring to FIG. 5, the diffraction grating 18 is unevenly shaped and diffracts incident light into a zero-order transmitted light 21 and positive and negative first-order diffracted lights 22 and 23. Therefore, the objective lens 5 shown in FIG. 4 focuses the zero-order transmitted light 21 and the positive and negative first-order diffracted lights 22 and 23 to thereby form three spots on the disc 6 (7). Also, referring to FIG. 6, each reflected light beam of the zero-order transmitted light 21 is received in either the first and second light receiving portions 16 and 17 of the photodetector 9' depending on which disc 6, 7 is placed in the optical recording/reproducing device, and each reflected light of the positive and negative first-order diffracted lights 22 and 23 is received in the third and fourth light receiving portions 19 and 20, respectively. The reproduction signals and focus error signals operate in the same manner as described above, and the track error signal S7 operates as follows:

$$S7 = S_i - S_j$$

where $S_i$ and $S_j$ are detection signals of the third and fourth light receiving portions 19 and 20, respectively. In other words, according to this embodiment, irrespective of the thickness of the disc, the operation circuit can be commonly used in detecting tracking error signals for a track servo, thereby simplifying the circuitry and servo.

As described above, according to the present invention, in order to form each aberration-corrected spot on discs having different thicknesses, a transparent plate having a diffraction grating formed on a part thereof is employed, thereby providing a simplified and optically stable optical pickup, in contrast to the conventional optical pickup which drives a diaphragm. Also, the optical pickup according to the present invention has a higher light efficiency than the conventional one using a hologram lens. Particularly, according to the present invention, since the light reflected from the discs having different thicknesses is received separately in the first and second light receiving portions of the photodetector, the detection of the reproduction signals without interference from each other is possible. Also, the focus and tracking errors for the respective discs can be detected precisely, irrespective of the disc thickness, to provide for a stable operation.

The present invention is not limited to the types of optical pickups or focus and track servo methods of an objective lens illustrated in the above and the drawings, but, on the contrary, is intended to cover various changes and modifications included within the spirit and scope of the appended claims.

What is claimed is:

1. A reproducing/recording optical pickup in an optical reproducing/recording device and compatible with discs having different thicknesses, comprising:
    a light source;
    an objective lens for focusing light generated from said light source onto one of said discs which is placed in the optical reproducing/recording device;
    a photodetector for detecting a signal by receiving the light reflected from the one disc; and
    a transparent plate having a central portion formed with a diffraction grating pattern for diffracting a first portion of light travelling from said light source through said diffraction grating pattern to said objective lens, and a transparent portion through which a second portion of the light from said light source passes,
    wherein said objective lens focuses a zero-order transmitted light separated by said diffraction grating pattern and the light passing through said transparent portion onto the one disc if the one disc has a first thickness, and focuses a positive first-order diffracted light diffracted by said diffraction grating pattern onto the one disc if the one disc has a second thickness greater than the first thickness.

2. A reproducing/recording optical pickup compatible with discs having different thicknesses as claimed in claim 1, wherein said diffraction grating pattern of said transparent plate has serrations.

3. A reproducing/recording optical pickup compatible for discs having different thicknesses as claimed in claim 1, further comprising a beam splitter disposed in an optical path between said light source and said objective lens, for splitting the light path of the incident light travelling from said light source toward said objective lens, wherein said transparent plate having said diffraction grating pattern is disposed in the optical path between said light source and said beam splitter.

4. A reproducing/recording optical pickup compatible with discs having different thicknesses as claimed in claim 1, wherein said photodetector has first and second light receiving portions, said first light receiving portion receiving reflected light from the one disc if the one disc has the first thickness and said second light receiving portion receiving reflected light from the one disc if the one disc has the second thickness.

5. A reproducing/recording optical pickup compatible with discs having different thicknesses, as claimed in claim 4, wherein said first and second light receiving portions of said photodetector each comprise four divided regions bisected horizontally and vertically, and the reproducing/recording optical pickup further comprises an astigmatism lens disposed along the optical path of the light travelling toward said photodetector.

6. A reproducing/recording optical pickup compatible with discs having different thicknesses as claimed in claim 1, further comprising a diffraction grating disposed in the optical path between said objective lens and said transparent plate, for diffracting the first and second portions of light transmitted via said transparent plate into a second zero-order transmitted light, a second positive first-order diffracted light and a negative first-order diffracted light, wherein said photodetector includes first and second receiving portions for receiving reflected light of said second zero-order transmitted light being reflected from the one disc based upon whether the one disc has the first or second thickness, respectively, and third and fourth receiving portions for receiving reflected lights of said second positive and negative first-order diffracted lights, respectively.

7. A reproducing/recording optical pickup compatible with discs having different thicknesses, as claimed in claim 6, wherein said first and second light receiving portions of said photodetector each comprise four divided regions bisected horizontally and vertically, and the reproducing/recording optical pickup further comprises an astigmatism lens disposed along the optical path of the light travelling toward said photodetector.

8. A reproducing/recording optical pickup in an optical reproducing/recording device and compatible with discs of different thicknesses, comprising:
    a light source to produce light;
    an objective lens to focus the light from the light source onto one of the discs which is placed in the optical reproducing/recording device;
    a photodetector having first and second light receiving portions, said first light receiving portion receiving a first reflected light from the one disc only if the one disc has a first thickness, and said second light receiving portion receiving a second reflected light from the one disc only if the one disc has a second thickness greater than the first thickness; and a control unit to control focus and compensate for tracking errors of said objective lens based upon the first and second reflected lights received by said first and second light receiving portions, respectively.

9. A reproducing/recording optical pickup as claimed in claim 8, wherein said control unit compensates for tracking errors of said objective lens based upon the first and second reflected lights received by said first and second light receiving portions, respectively.

10. A reproducing/recording optical pickup as claimed in claim 8, further comprising a transparent plate disposed in an optical path between said light source and said objective lens, said transparent plate having a portion with a diffraction grating pattern to diffract a first portion of the light passing through the diffraction grating pattern, and a transparent portion through which a second portion of the light from the light source passes, wherein said objective lens focuses a zero-order transmitted light of the first portion of the light separated by said diffraction grating pattern and the second portion of the light onto the one disc only if the one disc has the first thickness, and said objective lens focuses a positive first-order diffracted light of the second portion of the light separated by said diffraction grating pattern onto the one disc only if the one disc has the second thickness.

11. A reproducing/recording optical pickup as claimed in claim 10, wherein said diffraction grating pattern has serrations and is engraved in the central portion of said transparent plate.

12. A reproducing/recording optical pickup as claimed in claim 10, wherein each of said first and second light receiving portions comprise four divided regions bisected horizontally and vertically, a through d represent the four divided regions of said first light receiving portion, respectively and e through h represent the four divided regions of said second light receiving portion, respectively, and if the one disc has the first thickness then a reproduction signal of the optical pickup signal $=S_a+S_b+S_c+S_d$, a focus error signal of the optical pickup device $=(S_a+S_c)-(S_b+S_d)$, and a tracking error signal of the optical pickup device $=(S_a+S_b)-(S_c+S_d)$; and if the one disc has the second thickness then the reproduction signal of the optical pickup signal $=S_e+S_f+S_g+S_h$, the focus error signal of the optical pickup device $=(S_e+S_g)-(S_f+S_h)$, and the tracking error signal of the optical pickup device $=(S_e+S_f)-(S_g+S_h)$;

wherein $S_a$ through $S_h$ are signals output from the divided regions a through h, respectively.

13. A reproducing/recording optical pickup as claimed in claim 10, wherein the first thickness is approximately 0.6 mm and the second thickness is approximately 1.2 mm.

14. A reproducing/recording optical pickup as claimed in claim 8, wherein said objective lens has an aperture, wherein the objective lens focuses the light from said light source using all regions of the aperture if the one disc has the first thickness, and focuses the light from the light source using only limited regions of the aperture if the one disc has the second thickness.

15. A reproducing/recording optical pickup as claimed in claim 10, further comprising a diffraction grating disposed in an optical path between said transparent plate and said objective lens, to diffract the first and second portions of light passing through said transparent plate, into a second zero-order transmitted light, a second positive first-order diffracted light and a negative first-order diffracted light, wherein said objective lens focuses the second zero-order transmitted light, the second positive first-order diffracted light and the negative first-order diffracted light onto the one disc; and said photodetector further comprising third and fourth light receiving portions to receive the reflected light of said second positive first-order diffracted light and the negative first-order diffracted light from the one disc, respectively, and said first and second light receiving portions receiving the reflected light of said second zero-order transmitted light depending upon whether the one disc has the first thickness or the second thickness, respectively.

16. A reproducing/recording optical pickup as claimed in claim 15, wherein each of said first and second light receiving portions comprise four divided regions bisected horizontally and vertically, a through d represent the four divided regions of said first light receiving portion, respectively, e through h represent the four divided regions of said second light receiving portion, respectively, and i and j represent the third and fourth light receiving portions, respectively, and if the one disc has the first thickness then a reproduction signal of the optical pickup signal $=S_a+S_b+S_c+S_d$, a focus error signal of the optical pickup device $=(S_a+S_c)-(S_b+S_d)$, and a tracking error signal of the optical pickup device $=S_i-S_j$; and if the one disc has the second thickness then the reproduction signal of the optical pickup signal $=S_e+S_f+S_g+S_h$, the focus error signal of the optical pickup device $=(S_e+S_g)-(S_f+S_h)$, and the tracking error signal of the optical pickup device $=S_i-S_j$;

wherein $S_a$ through $S_h$ are signals output from the divided regions a through h, respectively, and $S_i$ and $S_j$ are signals output from the third and fourth light receiving portions.

17. A reproducing/recording optical pickup as claimed in claim 10, wherein each of said first and second light receiving portions comprise four divided regions bisected horizontally and vertically, said first light receiving portion is formed at a position coinciding with a central axis of said objective lens and said second light receiving portion is formed adjacent to said first light receiving portion.

18. A reproducing/recording optical pickup as claimed in claim 10, wherein each of said first and second light receiving portions comprise four divided regions bisected horizontally and vertically, said first light receiving portion is formed at a position coinciding with a central axis of said objective lens, said second light receiving portion is formed adjacent to said first light receiving portion, said third light receiving portion is disposed along first sides of said first and second light receiving portions, and said fourth light receiving portion is disposed along second sides of said first and second light receiving portions opposite the first sides.

19. A reproducing/recording optical pickup in an optical reproducing/recording and compatible with discs of different thicknesses, comprising:

a light source to produce light;

a transparent plate having a transparent portion and a portion formed with a diffraction grating pattern, to diffract the light passing through the diffraction grating pattern as zero-order transmitted light and positive first-order diffracted light and to pass the light passing through the transparent portion;

a beam splitter having a surface at an angle to an axis of said transparent plate, the surface reflecting the diffracted zero-order transmitted light and positive first-order diffracted light and passing light as first through third reflected lights, respectively;

an objective lens to focus the first through third reflected lights onto one of the discs which is placed in the reproducing/recording optical device and refocus the first through third disc reflected lights towards said beam splitter, the surface allowing the first through third disc reflected lights to pass through; and a photodetector having a first receiving portion to receive the first and third disc reflected lights which have passed through the surface only if the one disc has a first thickness, and a second receiving portion to receive the second disc reflected light which has passed through the surface only if the one disc has a second thickness greater than the first thickness.

20. A reproducing/recording optical pickup as claimed in claim 19, further comprising a diffraction grating disposed between said transparent plate and said beam splitter to diffract the diffracted and passing light from the transparent plate toward said beam splitter, to assist in determining a track servo signal.

21. A reproducing/recording optical pickup compatible with discs having different thicknesses as claimed in claim 1, wherein said photodetector has first and second light receiving portions, said first light receiving portion receiving reflected light from the one disc only if the one disc has the first thickness and said second light receiving portion receiving reflected light from the one disc only if the one disc has the second thickness.

22. A reproducing/recording optical pickup in an optical reproducing/recording device and compatible with discs of different thicknesses, comprising:

a light source to produce light;

an objective lens to focus the light from the light source onto one of the discs which is placed in the optical reproducing/recording device;

a photodetector having first and second light receiving portions, said first light receiving portion receiving reflected light from the one disc only if the one disc has a first thickness, and said second light receiving portion receiving reflected light from the one disc only if the one disc has a second thickness greater than the first thickness; and a control unit to control focus and compensate for tracking errors of said objective lens based upon the first and second reflected lights received by said first and second light receiving portions, respectively.

23. A reproducing/recording optical pickup in an optical reproducing/recording device and compatible with discs of different thicknesses, comprising:

a light source to produce light;

a transparent plate having a transparent portion and a portion formed with a diffraction grating pattern;

an objective lens, formed in an optical path between said light source and said transparent plate, to focus the light from the light source onto one of the discs which is placed in the optical reproducing/recording device;

a photodetector having first and second light receiving portions, said first light receiving portion receiving reflected light from the one disc only if the one disc has a first thickness, and said second light receiving portion receiving reflected light from the one disc only if the one disc has a second thickness greater than the first thickness; and a control unit to control focus and compensate for tracking errors of said objective lens based upon the first and second reflected lights received by said first and second light receiving portions, respectively.

* * * * *